United States Patent [19]

McIntyre et al.

[11] Patent Number: 4,829,104

[45] Date of Patent: May 9, 1989

[54] CONTROLLED FILM BUILD EPOXY COATINGS APPLIED BY CATHODIC ELECTRODEPOSITION

[75] Inventors: John M. McIntyre; Richard A. Hickner; Nancy A. Rao, all of Lake Jackson, Tex.

[73] Assignee: The Dow Chemical Company, Midland, Mich.

[21] Appl. No.: 887,850

[22] Filed: Jul. 18, 1986

[51] Int. Cl.$^4$ .................. C08K 3/20; C08L 63/02
[52] U.S. Cl. ..................... 523/403; 525/524
[58] Field of Search ................ 525/524; 523/403

[56] References Cited

U.S. PATENT DOCUMENTS

| | | | |
|---|---|---|---|
| 3,551,249 | 12/1970 | Harp et al. | 525/524 |
| 3,839,252 | 10/1974 | Bosso et al. | 523/414 |
| 3,907,731 | 9/1975 | Gardner, Jr. | 525/524 |
| 3,936,405 | 2/1976 | Sturni et al. | 523/414 |
| 4,117,361 | 9/1978 | Smith et al. | 525/524 |
| 4,315,044 | 2/1982 | Elmore et al. | 523/402 |
| 4,399,242 | 8/1983 | Fowler et al. | 525/524 |
| 4,486,558 | 12/1984 | Guilbert | 525/524 |

OTHER PUBLICATIONS

Helmreich, R. F. and Harry, L. D., "Two Flexible Epoxy Resins", *SPE Journal,* Dow Chemical Co., Jun. 1961, pp. 583-586.

*Primary Examiner*—Lewis T. Jacobs
*Assistant Examiner*—Robert E. L. Sellers, II

[57] ABSTRACT

A method for preparing an advanced epoxy cationic resin from an epoxy-based resin containing oxirane groups by converting at least some of the oxirane groups to cationic groups, wherein the improvement is using as the epoxy-based resin a blend of (I) an epoxy-based resin obtained by reacting in the presence of a suitable catalyst (1) a diglycidylether of a polyetherpolyol, such as a condensation product of dipropylene glycol and epichlorohydrin having an epoxy equivalent weight of 185, optionally (2) a diglycidylether of a dihydric phenol, for example a diglycidyl ether of bisphenol A, (3) a dihydric phenol such as bisphenol A, and optionally (4) a capping agent such as p-nonylphenol and (II) a different cationic epoxy-based resin. Such resin blends can be utilized in cathodic electrodeposition coating systems. Use of the diglycidylether of a polyetherpolyol provides coating compositions with lower viscosity and produces deposition coatings of higher film build than compositions without this component.

16 Claims, No Drawings

CONTROLLED FILM BUILD EPOXY COATINGS APPLIED BY CATHODIC ELECTRODEPOSITION

BACKGROUND OF THE INVENTION

1. Field of the Invention

The invention is concerned with the preparation of coating compositions from epoxy-based resins and their application by cathodic electrodeposition.

2. Description of the Prior Art

Electrodeposition has become an important method for the application of coatings over the last two decades and continues to grow in popularity because of its efficiency, uniformity and environmental acceptance. Cathodic electrodeposition has become dominant in areas where highly corrosion-resistant coatings are required, such as in primers for automobile bodies and parts. Epoxy based systems provide the best overall performance in this application and are widely used.

Cathodic electrodeposition resins based on conventional epoxies obtained by reacting liquid diglycidyl ethers of bisphenol A with bisphenol A to produce higher molecular weight epoxy resins have known disadvantages. Such products tend to have excessively high softening points resulting in poor flow out. In addition, such products require excessive amounts of solvent during their preparation. In order to improve flow, it has been proposed to modify such conventional epoxy resins by reaction with a diol in the presence of a tertiary amine catalyst. Thus, Bosso et al., U.S. Pat. No. 3,839,252, describes modification with polypropylene glycol. Marchetti et al., U.S. Pat. No. 3,947,339, teaches modification with polyesterdiols or polytetramethylene glycols. Wismer et al., U.S. Pat. No. 4,419,467, describes still another modification with diols derived from cyclic polyols reacted with ethylene oxide. These various modifications, however, also have disadvantages. Tertiary amines or strong bases are required to effect the reaction between the primary alcohols and the epoxy groups involved. Furthermore, these reactions require long reaction times and are subject to gellation because of competitive polymerization of the epoxy groups by the base catalyst. In addition epoxy resins containing low levels of chlorine are required to prevent deactivation of this catalyst.

Many coating formulations applied by electrodeposition include pigments to provide color, opacity, application, or film properties. U.S. Pat. No. 3,936,405, Sturni et al., describes pigment grinding vehicles especially useful in preparing stable, aqueous pigment dispersions for water-dispersible coating systems, particularly for application by electrodeposition. The final electrodepositable compositions, as described, contain the pigment dispersion and an ammonium or amine salt group solubilized cationic electrodepositable epoxy-containing vehicle resin and other ingredients typically used in electrodepositable compositions. Among the kinds of resins used are various polyepoxides such as polyglycidyl ethers of polyphenols, polyglycidyl ethers of polyhydric alcohols and polyepoxides having oxyalkylene groups in the epoxy molecule.

Moriarity et al., U.S. Pat. No. 4,432,850 discloses an aqueous dispersion of a blend of (A) an ungelled reaction product of a polyepoxide and a polyoxyalkylenepolyamine, which is then at least partially neutralized with acid to form cationic groups, and (B) an additional cationic resin different from (A). The resulting dispersion is applied by cathodic electrodeposition and is disclosed as providing high throw power and films which are better appearing, more flexible and more water-resistant.

Anderson et al. U.S. Pat. No. 4,575,523, discloses a film-forming resin composition which when combined with a crosslinking agent and solubilized, is capable of depositing high build coatings in cathodic electrodeposition processes. The resin is a reaction product of a modified epoxy formed by reacting a water-soluble or water-miscible polyol, an excess of polyamide, and an aliphatic monoepoxide.

The automobile industry still has needs in the areas of controlled film thickness. The ability to build thicker, uniform films which are smooth and free of defects will allow the elimination of an intermediate layer of paint known as a primer surface or spray primer, previously required to yield a sufficiently smooth surface for the topcoat. Such an elimination results in removal of one paint cycle and provides more efficient operations. Thickener electrocoat primers may also provide improved corrosion resistance.

SUMMARY OF THE INVENTION

The present invention is directed to a mixture of

I. an advanced epoxy-based cationic resin prepared by reacting in the presence of a suitable catalyst
 (A) a composition comprising (1) from about 20 to 100, preferably from about 30 to 100, weight percent of a diglycidyl ether of a polyetherpolyol and (2) from zero to about 80, preferably from zero to about 70, weight percent of a diglycidyl ether of a dihydric phenol with
 (B) at least one dihydric phenol and optionally,
 (C) a monofunctional capping agent; wherein components (A) and (B) are employed in such quantities that the resultant advanced epoxy resin has an average epoxide equivalent weight of from about 350 to about 10,000 and preferably from about 600 to about 3,000, whereby there is formed an advanced epoxy resin having terminal oxirane groups and subsequently converting at least some of the oxirane groups to cationic groups and II. a different epoxy-based cathodic electrodeposition resin.

The present invention is also directed to a coating composition comprising an aqueous dispersion of a mixture of the above-described advanced epoxy cationic resin with a different epoxy-based cationic resin and a method for coating such compositions.

Unexpectedly, incorporation of resins containing the advanced glycidyl ethers of polyetherpolyols into the blends confer to cathodically electrodepositable coating compositions produced therefrom the ability to build thicker films having controlled thickness during the electrodeposition process, as compared to a similar composition using an epoxy resin not containing the polyetherpolyol/glycidyl ether component. The ability to deposit thicker films is highly desirable for reducing the number of paint applications required while improving the corrosion resistance and appearance of the electrodeposited coating. The film thickness can be controlled by adjusting the amount of the diglycidylether of polyetherpolyol incorporated into the epoxy resin. Generally, thickness increases with increasing content of this component.

Another advantage is that the blends of cationic epoxy resins containing the diglycidylether of a polyetherpolyol have a lower viscosity at a given temperature than unmodified cationic resins of the same molecular weight. This lower viscosity allows the use of higher molecular weight resins and/or less solvent to achieve a viscosity comparable to an unmodified resin. The lower viscosity cationic resins allow the coating composition greater flowout during deposition and curing which results in better appearance. Alternatively, the lower viscosity cationic resins enable curing at lower temperatures to give equivalent flow and appearance. Finally, coatings produced using these epoxy resins have greater flexibility due to incorporation of the diglycidylether of a polyetherpolyol component as compared to those based on similar resins not containing that component.

All of the coating compositions of the invention provide useful cathodically electrodepositable coatings having improved flowout, film build, and flexibility properties due to the incorporation of the resin containing the diglycidyl ether of a polyetherpolyol as a component of the blend.

DETAILED DESCRIPTION OF THE INVENTION

The improvement of the present invention is provided by a blend of a selected advanced epoxy cationic resin with a different epoxy-based cathodic electrodeposition resin.

The Advanced Epoxy Cationic Resin

The starting epoxy resin component for preparing the advanced epoxy cationic resin required for the mixture of resins of this invention is an advanced resin prepared by reacting a composition comprising a glycidyl ether of a polyetherpolyol (A-1) and optionally a glycidyl ether of a dihydric phenol (A-2) with a dihydric phenol (B) and optionally, a monohydric capping agent (C). Glycidyl ethers of dihydric phenols useful for the preparation of these resins are those having at least one, and preferably an average of about two, vicinal epoxide groups per molecule. These polyepoxides can be produced by condensation of an epihalohydrin with a polyphenol in the presence of a basic acting substance.

Useful glycidyl ethers of polyphenols are represented by Formulae I and II:

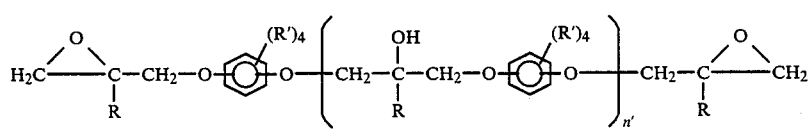

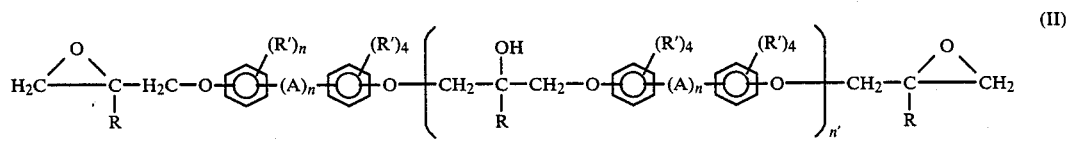

wherein A is a divalent hydrocarbon group having from 1 to 12, preferably 1 to 6, carbon atoms;

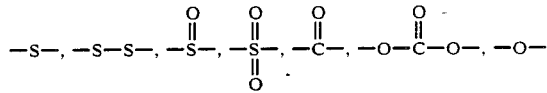

or the like; each R' is independently hydrogen, a hydrocarbyl or hydrocarbyloxy group having from 1 to 4 carbon atoms, or a halogen, preferably chlorine or bromine; R is independently hydrogen or a hydrocarbyl group having from 1 to 3 carbon atoms; n has a value from zero to 1; and n' has a value from zero to about 40, preferably from 0.1 to 5.

Polyphenols useful for the production of these polyepoxides include 2,2-bis(4-hydroxyphenyl)propane (bisphenol A), 1,1,-bis(4-hydroxyphenyl)ethane, bis(4-hydroxyphenyl)methane (bisphenol F), p,p'-hydroxybiphenol, resorcinol, hydroquinone, or the like. The particularly preferred polyglycidyl ethers of polyphenols are the diglycidyl ether of bisphenol A and the oligomeric polyglycidyl ethers of bisphenol A.

The glycidyl ethers of polyetherpolyols useful in preparation of these epoxy resins are those having the structure:

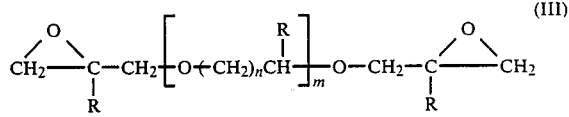

The glycidyl ethers of polyetherpolyols are produced by the condensation of an epihalohydrin with a polyetherpolyol having the structure:

$$H{+}O{-}X)_m OH$$

wherein X is

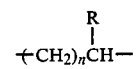

where R is hydrogen or an alkyl group having 1 to 6 carbon atoms, n has a value of 1 to 3 and m is a number having an average of from 2 to 40.

The polyetherpolyols may be produced by the polymerization of the appropriate alkylene oxide or of mixtures of various alkylene oxides to produce a chain having the desired R groups distributed among the units. Examples of useful polyetherpolyols are diethylene glycol, triethylene glycol, poly(ethylene glycol), dipropylene glycol, tripropylene glycol, poly(propylene glycol), di-1,2-butylene glycol, poly(1,2- butyleneoxide), poly(1,4-butanediol), and the like. The particularly preferred polyetherpolyols from which the diglycidyl ethers are derived are dipropylene glycol and poly(propylene glycol) in which the average value of m is between 5 and 20.

Some of the common methods of synthesis of the diglycidylethers of polyetherpolyols produce significant amounts of organic chloride-containing impurities. However, other processes are known for preparing products with lower levels of such impurities. While the low-chloride resins are not required for the practice of this invention, they may be used, if desired for possible improvements in the process of preparing the resins, in the storage properties of the resins or formulated coatings made therefrom or in the performance properties of the products.

Mixtures containing the above two glycidyl ether components are reacted with a diphenol and, optionally, a capping agent to produce epoxy-functional resins having the desired epoxide (oxirane) group content which are used to prepare the resins of the invention. The effective proportions of the diglycidyl ether components range from about 20 to 100 weight percent of the diglycidylether of a polyetherpolyol (A-1) and from about zero to about 80 weight percent of the diglycidyl ether of a diphenol (A-2). A preferred range is from about 30 to 100 weight percent of the diglycidylether of a polyetherpolyol and correspondingly from zero to about 70 weight percent of the diglycidyl ether of a phenol. The proportions of the glycidyl ether components ($A = A\text{-}1 + A\text{-}2$) and the dihydric phenol (B) are selected to provide an average epoxy equivalent weight in the advanced epoxy resin of from about 350 to about 10,000, preferably from about 600 to about 3,000. Such proportions usually are in the range of from about 60 to about 90 weight percent of A and from about 10 to about 40 weight percent of B. Useful diphenolic compounds include those described above as suitable for production of polyepoxide. The preferred diphenol is bisphenol A. Also useful are the bisphenols produced by chain extension of the diglycidyl ether of a bisphenol with a molar excess of a bisphenol to produce a diphenolic functional oligomeric product.

The use of capping agents such as monofunctional phenolic compounds provides the advantageous ability to reduce the epoxide content of the resulting product without chain-extension reactions and thus allows independent control of the average molecular weight and the epoxide content of the resulting resin within certain limits. Use of a monofunctional compound to terminate a certain portion of the resin chain ends also reduces the average epoxy functionality of the reaction product. The monofunctional phenolic compound is typically used at levels of zero to 0.7 equivalent of phenolic hydroxyl groups per equivalent of epoxy which would remain after reaction of substantially all of the phenolic groups of the diphenol.

Examples of useful monofunctional capping agents are monofunctional phenolic compounds such as phenol, tertiary-butyl phenol, cresol, para-nonyl phenol, higher alkyl substituted phenols, and the like. Particularly preferred is para-nonyl phenol. The total number of phenolic groups and the ratio of difunctional to monofunctional phenolic compounds, if any are used, are chosen so that there will be a stoichiometric excess of epoxide groups. Ratios are also chosen so that the resulting product will contain the desired concentration of terminal epoxy groups and the desired concentration of resin chain ends terminated by the monophenolic compound after substantially all of the phenolic groups are consumed by reaction with epoxy groups. Usually, the amount of the capping agent is from about 1 percent to about 15 percent based on the total weight of the A and B components.

These amounts are dependent on the respective equivalent weights of the reactants and the relative amounts of the epoxy-functional components and may be calculated by methods known in the art. In the practice of this invention, the desired epoxide content of the reaction product useful for preparation of the cationic resin is typically between 1 and 5 percent, calculated as the weight percentage of oxirane groups, and preferably is from about 2 to about 4 percent. These levels are preferred because they provide, after conversion, the desired cationic charge density in the resinous products useful in cathodic electrodeposition. These cationic resins are produced by conversion of part or all of the epoxy groups to cationic groups as described below.

Reaction of the monofunctional compound with epoxy groups of the polyglycidylether components of the reaction mixture may be done prior to, substantially simultaneously with, or subsequent to the chain-extension reactions of the diphenolic compound and the polyglycidylether components. The preferred method is to have all of the reactants present simultaneously.

Reactions of the above components to produce the epoxy resins are typically conducted by mixing the components and heating, usually in the presence of a suitable catalyst, to temperatures between 130° and 225° C., preferably between 150° and 200° C., until the desired epoxide content of the product is reached. The reaction optionally may be conducted in an appropriate solvent to reduce the viscosity, facilitate mixing and handling, and assist in controlling the heat of reaction.

Many useful catalysts for the desired reactions are known in the art. Examples of suitable catalysts include ethyltriphenylphosphonium acetate.acetic acid complex, ethyltriphenylphosphonium chloride, bromide, iodide, or phosphate, and tetrabutylphosphonium acetate. The catalysts are typically used at levels of 0.01 to 0.5 mole percent of the epoxide groups.

Appropriate solvents include aromatic solvents, glycol ethers, glycol ether esters, high boiling esters or ketones, or mixtures. Other useful solvents will be apparent to those skilled in the art. Preferred solvents are ethylene glycol monobutylether and propylene glycol monophenylether. Solvent content may range from zero to about 30 percent of the reaction mixture. A solvent is usually chosen which is compatible with the subsequent cation-forming reactions and with the final coating composition so that the solvent does not require subsequent removal.

The nucleophilic compounds which are used advantageously in forming the cations required by this invention are represented by the following classes of compounds, sometimes called Lewis bases:

(a) monobasic heteroaromatic nitrogen compounds, (b) tetra (lower alkyl)thioureas, (c) $R_1\text{-}S\text{-}R_2$ wherein $R_1$ and $R_2$ individually are lower alkyl, hydroxy lower alkyl or wherein $R_1$ and $R_2$ are combined as one alkylene radical having 3 to 5 carbon atoms

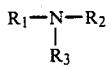

wherein $R_2$ and $R_3$ individually are lower alkyl, hydroxy lower alkyl,

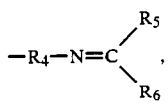

or are combined as one alkylene radical having from 3 to 5 carbon atoms, $R_4$ is an alkylene group having from 2 to 10 carbon atoms, $R_5$ and $R_6$ individually or lower alkyl and $R_1$ is hydrogen or lower alkyl, aralkyl or aryl, except that when $R_2$ and $R_3$ together are an alkylene group then $R_1$ is hydrogen, lower alkyl or hydroxyalkyl and when either or both of $R_2$ and $R_3$ is

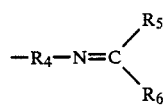

then $R_1$ is hydrogen,
(e)

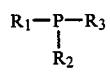

wherein $R_1$, $R_2$ and $R_3$ individually are lower alkyl, hydroxy lower alkyl or aryl.

In this specification the term lower alkyl means an alkyl having from 1 to 6 carbon atoms such as methyl, ethyl, propyl, isopropyl, n-butyl, isobutyl, n-pentyl, isopentyl, n-hexyl and isohexyl.

Representative specific nucleophilic compounds are pyridine, nicotinamide, quinoline, isoquinoline, tetramethyl thiourea, tetraethyl thiourea, hydroxyethylmethyl sulfide, hydroxyethylethyl sulfide, dimethyl sulfide, diethyl sulfide, di-n-propyl sulfide, methyln-propyl sulfide, methylbutyl sulfide, dibutyl sulfide, dihydroxyethyl sulfide, bis-hydroxybutyl sulfide, trimethylene sulfide, triacyclohexane, tetrahydrothiophene, dimethyl amine, diethyl amine, dibutyl amine, N-methylethanolamine, diethanolamine and the ketimine derivatives of polyamines containing secondary and primary amino groups such as those produced by the reaction of diethylene triamine or N-aminoethylpiperazine with acetone, methyl ethyl ketone or methylisobutyl ketone; N-methylpiperidine, N-ethylpyrrolidine, N-hydroxyethylpyrrolidine, trimethylphosphine, triethylphosphine, tri-n-butylphosphine, trimethylamine, triethylamine, tri-n-propylamine, tri-isobutylamine, hydroxyethyldimethylamine, butyldimethylamine, tri-hydroxyethylamine, triphenylphosphorus, and N,N,N-dimethylphenethylamine.

Substantially any organic acid, especially a carboxylic acid, can be used in the conversion reaction to form onium salts so long as the acid is sufficiently strong to promote the reaction between the nucleophile and the vicinal epoxide group(s) on the resinous reactant. In the case of the salts formed by addition of acid to a secondary amine/epoxy resin reaction product, the acid should be sufficiently strong to protonate the resultant tertiary amine product to the extent desired.

Monobasic acids are normally preferred ($H^{\oplus}A^{\ominus}$). Suitable organic acids include, for example, alkanoic acids having from 1 to 4 carbon atoms (e.g., acetic acid, propionic acid, etc.) alkenoic acids having up to 5 carbon atoms (e.g., acrylic acid, methacrylic acid, etc.) hydroxy-functional carboxylic acids (e.g., glycolic acid, lactic acid, etc.) and organic sulfonic acids (e.g., methanesulfonic acid), and the like. Presently preferred acids are lower alkanoic acids of 1 to 4 carbon atoms with lactic acid and acetic acid being most preferred. The anion can be exchanged, of course, by conventional anion exchange techniques. See, for example, U.S. Pat. No. 3,959,106 at column 19. Suitable anions are chloride, bromide, bisulfate, bicarbonate, nitrate, dihydrogen phosphate, lactate and alkanoates of 1–4 carbon atoms. Acetate and lactate are the most preferred anions.

The conversion reaction to cationic resins is normally conducted by merely blending the reactants together and maintaining the reaction mixture at an elevated temperature until the reaction is complete or substantially complete. The progress of the reaction is easily monitored. The reaction is normally conducted with stirring and is normally conducted under an atmosphere of inert gas (e.g., nitrogen). Satisfactory reaction rates occur at temperatures of from about 25° C. to about 100° C., with preferred reaction rates being observed at temperatures from about 60° to about 80° C.

Good results can be achieved by using substantially stoichiometric amounts of reactants although a slight excess or deficiency of the epoxy-containing resin or the nucleophile can be used. With weak acids, useful ratios of the reactants range from 0.5 to 1.0 equivalent of nucleophile per epoxide group of the resin and 0.6 to 1.1 equivalents of acid per epoxide. These rations, when combined with the preferred epoxide content resins described above, provide the desired range of cationic charge density required to produce a stable dispersion of the coating composition in water. With still weaker acids (e.g., a carboxylic acid, such as acetic acid) a slight excess of acid is preferred to maximize the yield of onium salts. In preparing the compositions in which the cationic group being formed is an onium group, the acid should be present during the reaction of the nucleophile and the epoxy group of the resin. When the nucleophile is a secondary amine, the amine-epoxy reaction can be conducted first, followed by addition of the acid to form the salt and thus produce the cationic form of the resin.

For the onium-forming reactions, the amount of water that is also included in the reaction mixture can be varied to convenience so long as there is sufficient acid and water present to stabilize the cationic salt formed during the course of the reaction. Normally, it has been found preferable to include water in the reaction in amounts of from about 5 to about 30 moles per epoxy equivalent. When the nucleophile is a secondary amine, the water can be added before, during, or after the resin epoxy group/nucleophile reaction. The preferred range of charge density of the cationic, advanced epoxy resin is from about 0.2 to about 0.6 milliequivalent of charge per gram of the resin.

It has also been found advantageous to include minor amounts of water-compatible organic solvents in the reaction mixture. The presence of such solvents tends to facilitate contact of the reactants and thereby promote the reaction rate. In this sense, this particular reaction is not unlike many other chemical reactions and the use of such solvent modifiers is conventional. The skilled artisan will, therefore, be aware of which organic solvents can be included. One class of solvents that we have found particularly beneficial are the monoalkyl ethers of the $C_2$—$C_4$ alkylene glycols. This class of compounds includes, for example, the monomethyl ether of ethylene glycol, the monobutyl ether of ethylene glycol, etc. A variety of these alkyl ethers of alkylene glycols are commercially available.

When a desired degree of reaction is reached, any excess nucleophile can be removed by standard methods, e.g., dialysis, vacuum stripping and steam distillation.

The Other Resin

The other resin which is blended with the advanced epoxy cationic resin containing the glycidylether of a polyetherpolyol component is broadly characterized as a different cathodically electrodepositable resin. Preferred kinds of the different electrodepositable resins are epoxy-based resins, particularly those resins containing a reacted glycidyl ether of a dihydric phenol which has been advanced with a dihydric phenol such as bisphenol A. Examples of these different cathodically electrodepositable resins include resins like those described above except that they contain none, or less than the minimum amount, of the advanced glycidyl ether of a polyetherpolyol. Conventional epoxy resins obtained by reacting liquid diglycidyl ethers of bisphenol A with bisphenol A are among the more specific examples of the class of other resins which can be a portion of the blend.

Several kinds of epoxy-based resins which may be used in the blends are described in various patents as follows: Jerabek in U.S. Pat. No. 4,031,050 describes cationic electrodeposition resins which are the reaction products of an epoxy-based resin and primary or secondary amines. U.S. Pat. No. 4,017,438 to Jerabek et al. describes reaction products or epoxy-based resins and blocked primary amines. Bosso et al. describe in U.S. Pats. Nos. 3,962,165; 3,975,346; 4,001,101 and 4,101,486 cationic electrodeposition resins which are reaction products of an epoxy-based resin and tertiary amines. Bosso et al. in U.S. Pat. No. 3,959,106 and DeBona in U.S. Pat. No. 3,793,278 describe cationic electrodeposition resins which are epoxy-based resins having sulfonium salt groups. Wessling et al. in U.S. Pat. No. 4,383,073 describes cationic electrodeposition resins which are epoxy-based resins having carbomoylpyridinium salt groups. U.S. Pat. No. 4,419,467 to Bosso et al. discusses epoxy-based resins reacted with primary, secondary and tertiary amine groups as well as quarternary ammonium groups and ternary sulfonium groups. U.S. Pat. No. 4,076,676 to Sommerfeld describes aqueous dispersions of epoxy-based cationic resins which are the reaction products of a terminally functional epoxy resin, a tertiary amine and a nitrogen resin. U.S. Pat. No. 4,134,864, to Belanger, describes reaction products of epoxy-based resins, polyamines and a capping agent. Still other suitable resins for use in the blends of this invention are described in the patents in the following list:

| U.S. Pat. No. | Patentee |
| --- | --- |
| 4,182,831 | Hicks |
| 4,190,564 | Tominaga et al. |
| 4,296,010 | Tominaga |
| 4,335,028 | Ting et al. |
| 4,339,369 | Hicks et al. |

Preparing the Blends

The blends of the critical resin containing the advanced glycidyl ether of a polyetherpolyol and the other resin can be prepared in any one of several ways.

To prepare the desired product in an aqueous dispersion can involve the following steps:
1. preparing the non-cationic resin,
2. converting the non-cationic resin to a cationic resin,
3. converting the cationic resin to a water-in-oil dispersion of the resin, and
4. converting the water-in-oil dispersion to an oil-in-water dispersion.

The blending of the critical resin and the other resin can occur with the resins at the same stage after step 1, after step 2, after step 3 or after step 4. Thus resins of the two types may be blended (a) as non-cationic resins, (b) as cationic resins (c) as water-in-oil dispersions of the cationic resins or (d) as oil-in-water dispersions. Subsequent steps are then carried out on the blended material (except for (d)), to form the desired product as an aqueous dispersion. These aqueous dispersions may be treated further as desired according to the discussion below in other embodiments of this invention.

The blending of the resins generally involves only gentle mixing. When blending is done with the non-cationic resins or with the cationic resins which are not yet in aqueous dispersion, a solvent for the resins optionally may be used to facilitate the mixing.

The relative amounts of the critical resin and the other resin in the blend are such as to provide from about 18 percent to about 90 percent of the critical resin, based on the total weight of cationic resin in the blend.

Other Embodiments of the Invention

The blends of resins of this invention in the form of aqueous dispersions are useful as coating compositions, especially when applied by electrodeposition. The coating compositions containing the blends of this invention as the sole resinous component are useful but it is preferred to include crosslinking agents in the coating composition to facilitate curing so that the coated films will be crosslinked and exhibit improved film properties. The most useful sites on the resin for crosslinking reactions are the secondary hydroxyl groups along the resin backbone. Materials suitable for use as crosslinking agents are those known to react with hydroxyl groups and include blocked polyisocyanates; amine-aldehyde resins such as melamine-formaldehyde, urea-formaldehyde, benzoguanine-formaldehyde, and their alkylated analogs; and phenol-aldehyde resins.

Particularly useful and preferred crosslinking agents are the blocked polyisocyanates which, at elevated temperatures, deblock and form isocyanate groups which react with the hydroxyl groups of the resin to crosslink the coating. Such crosslinkers are typically prepared by reaction of the polyisocyanate with a monofunctional active-hydrogen compound.

Examples of polyisocyanates suitable for preparation of the crosslinking agent are described in U.S. Pat. No. 3,959,106 to Bosso, et al., in Column 15, lines 1-24, incorporated by reference herein. Also suitable are isocyanate-functional prepolymers derived from polyisocyanates and polyols using excess isocyanate groups. Examples of suitable prepolymers are described by Bosso, et al., in U.S. Pat. No. 3,959,106, Column 15, lines 25-57, incorporated herein by reference. In the preparation of the prepolymers, reactant functionality, equivalent ratios, and methods of contacting the reactants must be chosen in accordance with considerations known in the art to provide ungelled products having the desired functionality and equivalent weight.

Examples of polyisocyanates are the isocyanurate trimer of hexamethylene diisocyanate, toluene diisocyanate, methylene diphenylene diisocyanate, isophorone diisocyanate, and a prepolymer from toluene diisocyanate ad polypropylene glycol and a prepolymer of toluene diisocyanate and trimethylolpropane.

Suitable blocking agents include alcohols, phenols, oximes, lactams, and N,N-dialkylamides or esters of alpha-hydroxyl group containing carboxylic acids. Examples of suitable blocking agents are described in U.S. Pat. No. 3,959,106 to Bosso, et al., in Column 15, line 58, through Column 16, line 6, and in U.S. Pat. No. 4,452,930 to Moriarity. Particularly useful are the oximes of ketones, also known are ketoximes, due to their tendency to deblock at relatively lower temperatures and provide a coating composition which can be cured at significantly lower temperatures. The particularly preferred ketoxime is methyl ethyl ketoxime.

These cationic resins of the invention, when formulated with certain preferred ketoxime-blocked polyisocyanates, provide coating compositions which cure at significantly lower temperatures than those of the prior art.

The blocked polyisocyanates are prepared by reacting equivalent amounts of the isocyanate and the blocking agent in an inert atmosphere such as nitrogen at temperatures between 25° to 100° C., preferably below 70° C. to control the exothermic reaction. Sufficient blocking agent is used so that the product contains no residual, free isocyanate groups. A solvent compatible with the reactants, product, and the coating composition may be used such as ketone or an ether. A catalyst may also be employed such as dibutyl tin dilaurate.

The blocked polyisocyanate crosslinking agents are incorporated into the coating composition at levels coresponding to from about 0.2 to about 2.0 blocked isocyanate groups per hydroxyl group of the cationic resin.

A catalyst optionally may be included in the coating composition to provide faster or more complete curing of the coating. Suitable catalysts for the various classes of crosslinking agents are known to those skilled in the art. For the coating compositions using the blocked polyisocyanates as crosslinking agents, suitable catalyst include dibutyl tin dilaurate, dibutyl tin diacetate, dibutyl tin oxide, stannous octanoate, and other urethane-forming catalysts known in the art. The preferred catalyst is dibutyl tin dilaurate. Amounts used typically range between 0.1 and 3 weight percent of binder solids.

Unpigmented coating compositions are prepared by mixing the cationic resin blend with the crosslinking agent and optionally any additives such as catalyst, solvents, surfactants, flow modifiers, defoamers, or other additives. This mixture is then dispersed in water by way of the known methods. A particularly preferred method is the technique known as phase-inversion emulsification, wherein water is slowly added with agitation to the above mixture, usually at temperatures ranging from ambient to 90° C., until the phases invert to form an organic phase-in-water dispersion. The solids content of the aqueous dispersion is usually between 5 and 30 percent by weight and preferably between 10 and 25 percent by weight for application by electrodeposition.

Pigmented coating compositions are prepared by adding a concentrated dispersion of pigments and extenders to the unpigmented coating compositions. This pigment dispersion is prepared by grinding the pigments together with a suitable pigment grinding vehicle in a suitable mill as known in the art.

Pigments and extenders known in the art are suitable for use in these coatings including pigments which increase the corrosion resistance of the coatings. Examples of useful pigments or extenders include titanium dioxide, talc, clay, lead oxide, lead silicates, lead chromates, carbon black, strontium chromate, and barium sulfate.

Pigment grinding vehicles are known in the art. A preferred pigment grinding vehicle for use in this invention consists of a water-soluble cationic resinous product, water, and a minor amount of glycol ether solvent. The cationic resinous product is prepared by reacting an epichlorohydrin/bisphenol A condensation product having an epoxide group content of about 8 percent with a nucleophile, an acid, and water in a similar fashion as described above for the cationic resins used in the preferred embodiment of the invention. The water-soluble product may be diluted with water to form a clear solution useful as a pigment grinding vehicle.

The pH and/or conductivity of the coating compositions may be adjusted to desired levels by the addition of compatible acids, bases, and/or electrolytes known in the art. Other additives such as solvents, surfactant, defoamers, anti-oxidants, bactericides, etc. may also be added to modify or optimize properties of the compositions or the coating in accordance with practices known to those skilled in the art.

Although the coating compositions of the invention may be applied by any conventional technique for aqueous coatings, they are particularly useful for application by cathodic electrodeposition, wherein the article to be coated is immersed in the coating composition and made the cathode, with a suitable anode in contact with the coating composition. When sufficient voltage is applied, a film of the coating deposits on the cathode and adheres. Voltage may range from 10 to 1,000 volts, typically 50 to 500. The film thickness achieved generally increases with increasing voltage. In the case of the coating compositions of the invention, thicker films are achieved by incorporation of the diglycidyl ether of a polyetherpolyol into the epoxy resin used to produce the cationic resins of the invention. Also, control over the final thickness may be exercised by adjusting the amount of that component used. Current is allowed to flow for between a few seconds to several minutes, typically two minutes, over which time the current usually decreases. Any electrically conductive substrate may be coated in this fashion, especially metals such as steel and aluminum. Other aspects of the electrodeposition process, such as bath maintenance, are conventional. After deposition, the article is removed from the bath and typically rinsed with water to remove that coating composition which does not adhere.

The uncured coating film on the article is cured by heating at elevated temperatures, ranging from about 200° to about 400° F., for periods of about 1 to about 60 minutes.

EXAMPLES

In the following examples, various materials were used which are characterized as follows:

Epoxy Resin A is a condensation product of bisphenol A and epichlorohydrin having an epoxide equivalent weight of 187.

Epoxy Resin B is a condensation product of dipropylene glycol and epichlorohydrin having an epoxide equivalent weight of 185.

Epoxy Resin C is a condensation product of a diglycidylether of bisphenol A having an epoxide equivalent weight of 185 and bisphenol A, said condensation production having an epoxide equivalent weight of 1807.

Epoxy Resin D is a condensation product of a diglycidyl ether of bisphenol A having an epoxide equivalent weight of 185 and bisphenol A, said condensation product having an epoxide equivalent weight of 475 to 575.

ED 3002, marketed by PPG Industries, Inc., is a commercial cathodic electrodeposition primer containing an epoxy-based advanced resin and is herein described as a conventional electrodeposition primer.

Curing Agent A is a blocked polyisocyanate available from Mobay Chemical Company as Desmodur KL5-2540. The material is believed to be the reaction product of methyl ethyl ketoxime and a polyisocyanate which is substantially the isocyanaurate trimer of hexamethylene diisocyanate. The product is supplied as a 75 percent solution of the blocked polyisocyanate in propylene glycol monomethylether acetate.

Curing Agent B was prepared as follows: To a solution of 174 parts of toluene diisocyanate and 102 parts of methoxy propyl acetate at 50° C. is added dropwise 106 parts of polypropylene glycol (425 molecular weight). An exothermic reaction raises the temperature to 65° C. and the mixture is allowed to cool to 55° C. upon which 131 parts of methyl ethyl ketoxime is added dropwise. Cooling is applied due to an exothermic reaction reaching 75° C. Another 102 parts of methoxy propyl acetate is added and the mixture is heated at 70° C. for 45 minutes longer. The temperature of the reaction mixture was allowed to rise to 50° to 60° C. during the addition. The reaction mixture was then cooled to ambient temperature over 2 hours. The infrared spectrum of the product showed no residual unreacted isocyanate groups. The product solution was approximately 68.9 percent non-volatile.

Curing Agent C was prepared as follows: 38.7 grams of 2-ethylhexanol was added slowly to 119.8 grams of a 60 percent solution of toluene diisocyanate-trimethylol propane prepolymer in a methoxy propyl acetate solvent to which had been added 0.073 gram of dibutyl tin dilaurate catalyst. The reaction was conducted in an agitated closed vessel under a dry nitrogen blanket with external temperature control to keep the reacting temperature under 60° C. After a few hours there was no detectable free isocyanate as determined by infrared spectrophotometric analysis.

Pigment Grinding Vehicle A was prepared by reacting, at 70° C., a mixture of 90 grams of Epoxy Resin D and 10 grams of an ethylene glycol butyl ether solvent with an aqueous solution containing 13.1 grams of nicotinamide, 12.2 grams of lactic acid, and 64.3 grams of water for 6 hours. Upon completion of the onium-forming reaction, 98.6 grams of water was added slowly while agitating continuously at 60° C. The pigment grinding vehicle had a solids content of 40 percent.

Pigment Paste A was prepared by mixing the following: 525 grams of Pigment Grinding Vehicle A (40 percent solids), 105 grams of carbon black, 210 grams of basic silicate white lead, 367.5 grams of titanium dioxide, 367.5 grams of ASP 200 clay, and 131.3 grams of deionized water. These materials were mixed together by using a paint shaker. The pigment-to-vehicle ratio of the pigment paste was 5:1.

Pigment Grinding Vehicle B was prepared by the following procedure:

Into a 2-liter, round-bottomed flask fitted with a nitrogen inlet, thermometer, mechanical stirrer, and condenser were charged 511.5 grams of Epoxy Resin A and 163.5 grams of bisphenol A. The mixture was stirred in a nitrogen atmosphere and heated to 90° C. to form a clear mixture. A solution of 70 percent by weight of ethyltriphenylphosphonium acetate in methanol (0.89 grams) was added and the mixture heated to 150° C. and allowed to exotherm. Peak exotherm temperature was controlled to below 185° C. by cooling. The temperature was then maintained at 185° C. until about 75 minutes past peak exotherm when an epoxide equivalent weight of 526 grams/equivalent was obtained.

To the above resin was added 75 grams of ethylene glycol butyl ether solvent at a temperature between 110° to 130° C. The resin solution was cooled to 80° C. and an aqueous mixture consisting of 85.7 grams of N,N-dimethylethanolamine, 154.6 grams of an aqueous solution containing 71 percent of lactic acid and 288.9 grams deionized water was added over a period of 30 minutes to produce an opaque, whitish, viscous mixture. A reaction temperature of 80° C. was maintained for 4 hours. This mixture was heated at 70° C. for 10.5 hours longer to obtain a complete reaction. The product was diluted to 30 percent solids by the dropwise addition of deionized water at 60° C.

Pigment Paste B was prepared similarly to Pigment Paste A with the exception that Pigment Grinding Vehicle B is used. The pigment-to-vehicle ratio of the pigment paste was 5:1.

Pigment Paste C was prepared by mixing the following: Pigment Grinding Vehicle A, ASP 200 clay, lead silicate, carbon black, titanium dioxide, lead silicon chromate and water. These ingredients were mixed together and ground in a pigment grinding mill. The pigment-to-vehicle ratio of the pigment paste was 5:1.

EXAMPLE 1

A cationic electrodeposition resin was prepared as follows: Into a suitable reactor were charged 132 grams of Epoxy Resin B and 68 grams of bisphenol A. The mixture was heated to 90° C. and 0.25 gram of ethyl triphenyl phosphonium acetate catalyst blended with 0.10 gram of methanol were added. This blend was stirred while heating at 1.5° C./min to 150° C. whereupon it exothermed to 170° C. where the temperature was held for about one hour. The epoxy equivalent weight (EEW) of the resulting resin was 1878. The resin was cooled to 120° C. and 22.2 grams of a propylene glycol phenyl ether solvent was added. The resin solution was further cooled to 60° C. (initial Epoxy Resin 1) and 8.0 grams of methyl ethanol amine was added whereupon it exothermed to 67° C. and the temperature was controlled at 60° C. for one hour.

To the reaction product at 60° C. were added 4.86 grams of dibutyl tin dilaurate catalyst and 158.2 grams of Curing Agent C.

While agitating continuously, a cationic dispersion was prepared by adding to the resulting mixture, at 60° C., 13.5 grams of an aqueous solution containing 71 percent of lactic acid followed by the slow addition of 1741.4 grams of water (Resin Dispersion 1).

The cationic dispersion described above was blended with a commercial cathodic electrodeposition primer, ED 3002. Cationic electrodeposition baths were prepared by adding 10, 20, 30 and 40 weight percent of the above-described dispersion to ED 3002.

Steel panels pretreated with zinc phosphate were cathodically electrocoated in the bath at 200, 250, and 300 volts for 2 minutes at a bath temperature of 82° F. (27° C.). The wet films were baked at 350° F. (176° C.) for 30 minutes. Film thicknesses are shown in Table I.

TABLE I

| Resin Dispersion 1 Percent | ED 3002 Percent | Film Thicknesses (mils) | | |
|---|---|---|---|---|
| | | 200 volts | 250 volts | 300 volts |
| 0* | 100 | 0.45 | 0.57 | 0.64 |
| 10 | 90 | 0.47 | 0.59 | 0.76 |
| 20 | 80 | 0.54 | 0.61 | 0.87 |
| 30 | 70 | 0.59 | 0.76 | 0.93 |
| 40 | 60 | 0.71 | 0.87 | 1.02 |

*Not an example of the invention.

This data shows that film thicknesses can be controlled by blending different proportions of the described critical cationic electrodeposition dispersion with a commercial cathodic electrodeposition paint and applying the resulting paint at a selected deposition voltage.

EXAMPLE 2

A cationic electrodeposition resin was prepared as follows: Into a suitable reactor were charged 150 grams of Epoxy Resin C and 50 grams of an epoxy resin like initial Epoxy Resin I, which had an epoxy equivalent weight of 1,830. To this mixture was added 22.2 grams of propylene glycol phenyl ether solvent while heating at a temperature between 110° to 130° C. This mixture was then cooled to 80° C. and 8.25 grams of methyl ethanol amine was added dropwise. This mixture was stirred at 80° C. for one hour.

To the reaction product at 60° C. was added 2.28 grams of dibutyl tin dilaurate catalyst and 152 grams of Curing Agent A. While agitating continuously, a cationic dispersion was prepared by adding to the resulting mixture, at 70° C., 11.25 grams of an aqueous solution containing 88 percent of lactic acid followed by the slow addition of 1,555 grams of deionized water. The pH of the resulting cationic dispersion was adjusted to 6.0 by the dropwise addition of diethylethanolamine. The product was an aqueous dispersion containing 18 percent solids of a blend of cationic resins (Resin Dispersion 2).

Steel panels, pretreated with zinc phosphate, were cathodically electrocoated with Resin Dispersion 2 in the bath at 200, 225, 250 and 275 volts for 2 minutes at a bath temperature of 82° F. (27° C.). The wet coatings were cured at 275° C. (135° C.) for 30 minutes. Film thicknesses were measured and are reported in Table II.

TABLE II

| Voltage | Film Thicknesses (Mils) |
|---|---|
| 200 | 0.7 |
| 225 | 1.1 |
| 250 | 2.7 |
| 275 | 3.0 |

This data shows that a cationic electrodeposition paint can be prepared by mixing separately prepared advanced epoxy resins which are then reacted to form cationic resins.

EXAMPLE 3

Into a 2-liter, round-bottomed flask fitted with a nitrogen inlet thermometer, mechanical stirrer, and condenser were charged 725 grams of Epoxy Resin A, 355 grams bisphenol A, and 120 grams of 95 percent grade para-nonyl phenol. The mixture was stirred in a nitrogen atmosphere and heated to 90° C. form a clear mixture. A solution of 70 percent by weight of ethyltriphenylphosphonium acetate in methanol (0.77 grams) was added and the mixture heated to 150° C. and allowed to exotherm. Peak exotherm temperature was controlled to below 185° C. by cooling. The temperature was then maintained at 175° C. until about 75 minutes past peak exotherm when the desired epoxide content was reached. The epoxide equivalent weight of the product was 1,822 (Epoxy Resin 3A).

The cationic resin was prepared as follows: To 296 grams of the resulting advanced resin at a temperature between 110° to 130° C. was added 30.0 grams of propylene glycol monophenyl ether solvent. The resin solution was further cooled to 80° C. and an aqueous mixture comprised of 14.9 grams nicotinamide, 15.7 grams of an aqueous solution containing 88 percent of lactic acid, and 72.9 grams of deionized water was added over a period of 30 minutes to produce an opaque, whitish, viscous mixture. A reaction temperature of 80° C. was maintained for four hours. The product was a clear, light yellow, highly viscous solution (Cationic Resin 3A).

Into a 2-liter, round-bottom flask fitted with a nitrogen inlet, thermometer, mechanical stirrer, and condenser, were charged 438 grams Epoxy Resin B, 272 grams bisphenol A, and 90.0 grams of 95 percent grade para-nonyl phenol. The mixture was stirred in a nitrogen atmosphere and heated to 90° C. to form a clear mixture. A solution of 70 percent by weight of ethyltriphenylphosphonium acetate in methanol (1.57 grams) was added and the mixture was heated to 150° C. and allowed to exotherm. Peak exotherm temperature was controlled to below 185° C. by cooling. The temperature was then maintained at 175° C. until about 75 minutes past peak exotherm when the desired epoxide content was reached. The epoxide equivalent weight of the product was 2,905 (Epoxy Resin 3B).

The resulting resin was converted to a cationic resin (Cationic Resin 3B) in the same manner as described for Cationic Resin 3A above.

To 180 grams of Cationic Resin 3A was added 60 grams of Cationic Resin 3B and this mixture was heated under nitrogen atomosphere at 75° C. While stirring continuously, a cationic dispersion was prepared by adding 132.2 grams of Curing Agent C and 1.82 grams of dibutyl tin dilaurate catalyst followed by the dropwise addition of 1,156 grams of deionized water. The pH of the cationic dispersion was adjusted to 6.0 by the dropwise addition of diethylethanolamine.

Steel panels, pretreated with zinc phosphate, were cathodically electrocoated in the bath at various voltages for 2 minutes at a bath temperature of 82° F. (27° C.). The wet coating were cured at 350° F. (176° C.) for 30 minutes. Film thicknesses are shown in Table III.

TABLE III

| Voltage | Film Thicknesses (mils) |
| --- | --- |
| 200 | 0.34 |
| 250 | 0.85 |

The cationic electrodeposition paint was pigmented with Pigment Paste a to yield a pigment-to-vehicle ratio of 0.2/1.0. The pigmented paint was electrocoated according to the procedure described above, and the data are reported in Table IV.

TABLE IV

| Voltage | Film Thicknesses (Mils) |
| --- | --- |
| 200 | 0.40 |
| 250 | 1.5 |

This data shows that a cationic electrodeposition paint can be prepared by mixing separately prepared cationic resins which can then be formulated together. When compared to cationic electrodeposition paint 10B, the data shows that this paint has increased film build.

EXAMPLE 4

A cathodic electrodeposition dispersion was prepared by blending 215 grams of Cationic Resin 3A with 71.5 grams of Cationic Resin 3B and heating under nitrogen atmosphere at 75° C. While stirring continuously, 2.1 grams of dibutyl tin dilaurate catalyst and 179 grams of Curing Agent B were added.

The dropwise addition of 1,767 grams of deionized water was then begun. The pH of the cationic dispersion was adjusted to 6.0 by the dropwise addition of diethylethanolamine. This resultant dispersion is then used to make coatings by cathodic electrodeposition.

Steel panels, pretreated with zinc phosphate, were cathodically electrocoated in the bath at various voltages for 2 minutes at a bath temperature of 82° F. (27° C.). The wet coatings were cured at 275° F. (135° C.) for 30 minutes. Film thicknesses are shown in Table V.

TABLE V

| Voltage | Film Thicknesses (mils) |
| --- | --- |
| 200 | 1.5 |
| 225 | 2.8 |
| 250 | 4.6 |
| 275 | 5.5 |

The cationic electrodeposition paint was pigmented with Pigment Paste A to yield a pigment-to-vehicle ratio of 0.2/1.0. The pigmented paint was electrocoated according to the procedure described above. The data are listed in Table VI.

TABLE VI

| Voltage | Film Thicknesses (mils) |
| --- | --- |
| 200 | 1.0 |
| 225 | 1.3 |
| 250 | 1.6 |
| 275 | 1.9 |

This data shows that a cationic electrodeposition paint can be prepared by mixing separately prepared cationic resins which can them be formulated together. When compared to cationic electrodeposition paint 10B, this data shows that this paint has increased film build.

EXAMPLE 5

A cathodic electrodeposition dispersion was prepared as follows: With 188 grams of Cationic Resin 3A was blended 62.5 grams of Cationic Resin 3B. This mixture was heated under nitrogen at 75° C. While stirring continuously, 2.25 grams of dibutyl tin dilaurate catalyst and 150 grams of Curing Agent A were added.

The dropwise addition of 1,485 grams deionized water was then begun. The pH of the cationic dispersion was adjusted to 6.0 by the dropwise addition of diethylethanolamine. This resultant dispersion was then used in a bath for cathodic electrodeposition.

Steel panels, pretreated with zinc phosphate, were cathodically electrocoated in the bath at various voltages for 2 minutes at a bath temperature of 82° F. (27° C.). The wet coatings were cured at 275° F. (135° C.) for 30 minutes. Film thicknesses are shown in Table VII.

TABLE VII

| Voltage | Film Thicknesses (mils) |
| --- | --- |
| 200 | 1.5 |
| 225 | 1.7 |
| 250 | 1.9 |

The cationic electrodeposition paint was pigmented with Pigment Paste A to yield a pigment-to-vehicle ratio of 0.2/1.0. The pigmented paint was electrocoated according to the procedure described above; the data are listed in Table VIII.

TABLE VIII

| Voltage | Film Thicknesses (mils) |
| --- | --- |
| 200 | 1.3 |
| 225 | 1.4 |
| 250 | 1.6 |
| 275 | 1.7 |

This data shows that a cationic electrodeposition paint can be prepared by mixing separately prepared cationic resins which can then be formulated together. When compared to cationic electrodeposition paint 10B, this data shows this paint has increased film build.

EXAMPLE 6

A cationic resin was prepared as follows: To 650 grams of an epoxy resin like Epoxy Resin 3A, which had an epoxide equivalent weight of 1,870 was added 65.0 grams of propylene glycol phenyl ether solvent at a temperature between 110° to 130° C. The resin was cooled to 80° C. and an aqueous mixture consisting of 23.1 grams of N,N-dimethylethanolamine, 33.8 grams of an aqueous solution containing 88 percent of lactic acid, and 157 grams deionized water was added over a period of 30 minutes to produce an opaque, whitish, viscous mixture. A reaction temperature of 80° C. was maintained for 4 hours. The product was a clear, light yellow, highly viscous solution (Cationic Resin 6A).

A cationic resin was prepared as follows: To 400 grams of an epoxy resin like Epoxy Resin 3B from Example 3 which had an epoxide equivalent weight of 2,009 was added 40.0 grams of propylene glycol phenyl ether solvent at a temperature between 110° to 130° C. The resin was cooled to 80° C. and an aqueous mixture consisting of 13.3 grams of N,N-dimethylethanolamine, 19.3 grams of an aqueous solution containing 88 percent lactic acid, and 89.6 grams of deionized water was added over a period of 30 minutes to produce an opaque, whitish, viscous mixture. A reaction temperature of 80° C. was maintained for 4 hours. The product was a clear, light yellow, highly viscous solution (Cationic Resin 6B).

To 160 grams of Cationic Resin 6A was added 53 grams of the Cationic Resin 6B and this mixture was heated under nitrogen atmosphere at 75° C. While stirring continuously, a cationic dispersion was prepared by adding 139.0 grams of the Curing Agent C and 1.92 grams dibutyl tin dilaurate catalyst followed by the dropwise addition of 1,257 grams of deionized water. The pH of the cationic dispersion was adjusted to 6.0 by the dropwise addition of diethylethanolamine. The resultant dispersion was then used in a bath for cathodic electrodeposition.

Steel panels, pretreated with zinc phosphate, were cathodically electrocoated in the bath at various voltages for 2 minutes at a bath temperature of 82° F. (27° C.). The wet coatings were cured at 350° F. (176° C.) for 30 minutes. Film thicknesses are shown in Table IX.

TABLE IX

| Voltage | Film Thicknesses (Mils) |
|---|---|
| 200 | 0.63 |
| 225 | 0.88 |
| 250 | 0.95 |
| 275 | 1.20 |

A cationic electrodeposition paint was pigmented with Pigment Paste B to yield a pigment-to-vehicle ratio of 0.2 to 1.0. The pigmented paint was electrocoated according to the procedure described above, and the data are listed in Table X.

TABLE X

| Voltage | Film Thickness (mils) |
|---|---|
| 200 | 0.67 |
| 225 | 0.78 |
| 250 | 0.80 |
| 275 | 1.4 |

This data shows that a cationic electrodeposition paint can be prepared by mixing separately prepared cationic resins which can be formulated together. When compared to cationic electrodeposition paint 10B, this data shows that this paint has increased film build.

EXAMPLE 7

To 160 grams of Cationic Resin 6A from Example 6 was added 53 grams of Cationic Resin 6B and this mixture was heated under nitrogen atmosphere at 75° C. While stirring continuously, a cationic dispersion was prepared by adding 120 grams of Curing Agent B and 1.92 gram of dibutyl tin dilaurate catalyst followed by the dropwise addition of 1,276 grams of deionized water.

The pH of the cationic dispersion was adjusted to 6.0 by the dropwise addition of diethylethanolamine. This dispersion was then used in a bath for cathodic electrodeposition.

Steel panels, pretreated with zinc phosphate, were cathodically electrocoated in the bath at various voltage for 2 minutes at a bath temperature of 82° F. (27° C.). The wet coatings were cured at 275° F. (135° C.) for 30 minutes. Film thicknesses are shown in Table XI.

TABLE XI

| Voltage | Film Thicknesses (mils) |
|---|---|
| 200 | 1.6 |
| 225 | 5.2 |
| 250 | 6.2 |
| 275 | 6.7 |

The cationic electrodeposition paint was pigmented with Pigment Paste B to yield a pigment-to-vehicle ratio of 0.2/1.0. The pigmented paint was electrocoated according to the procedure described above; the data is listed in Table XII.

TABLE XII

| Voltage | Film Thicknesses (Mils) |
|---|---|
| 200 | 2.0 |
| 225 | 2.4 |
| 250 | 3.3 |

This data shows that a cationic electrodeposition paint can be prepared by mixing separately prepared cationic resins which can be formulated together. When compared to cationic electrodeposition paint 10B, this data shows that this paint has increased film build.

EXAMPLE 8

A cathodic electrodeposition dispersion was prepared as follows: With 160 grams of Cationic Resin 6A was blended 53.0 grams of Cationic Resin 6B. This mixture was heated under nitrogen at 75° C. While stirring continuously, 1.92 gram of dibutyl tin dilaurate catalyst and 128 grams of Curing Agent A were added. A dispersion was made by adding dropwise 1,268 grams deionized water.

The pH of the cationic dispersion was adjusted to 6.0 by the dropwise addition of diethylethanolamine. This dispersion was then used in a bath for cathodic electrodeposition.

Steel panels pretreated with zinc phosphate, were cathodically electrocoated in the bath at various voltages for 2 minutes at a bath temperature of 82° F. (27° C.). The wet coatings were cured at 275° F. (135° C.) for 30 minutes. Film thicknesses are shown in Table XIII.

TABLE XIII

| Voltage | Film Thicknesses (mils) |
|---|---|
| 200 | 2.3 |

TABLE XIII-continued

| Voltage | Film Thicknesses (mils) |
|---|---|
| 225 | 3.6 |
| 250 | 3.1 |

The cationic electrodeposition paint was pigmented with Pigment Paste B to yield a pigment-to-vehicle ratio of 0.2/1.0. The pigmented paint was electrocoated according to the procedure described above; the data is listed in Table XIV.

TABLE XIV

| Voltage | Film Thicknesses (mils) |
|---|---|
| 200 | 2.7 |
| 225 | 3.1 |
| 250 | 4.1 |

This data shows that a cationic electrodeposition paint can be prepared by mixing separately prepared resins which can be formulated together. When compared to cationic electrodeposition paint 10B, this data shows that this paint has increased film build.

EXAMPLE 9

A cationic electrodeposition resin was prepared as follows: An epoxy resin was prepared by reacting Epoxy Resin B with bisphenol A as described in Example 1. The epoxy equivalent weight of the resulting resin was 1700. When the 200 grams of resin cooled to 120° C., 10.5 grams of an ethylene glycol butyl ether was added and the resin cooled further to 70° C. A solution containing 10.76 grams of nicotinamide, 10.05 grams of lactic acid, and 52.92 grams of water was added slowly to the resin over 30 minutes while holding the temperature at 70° C. The reactants were held at 70° C. for an additional 5.5 hours to prepare a resin having onium groups (Resin 9).

To the reaction product at 60° C. were added 5.63 grams of dibutyl tin dilaurate catalyst and 206.1 grams of Curing Agent A. A cationic dispersion was prepared by adding 1,492 grams of water to the resulting mixture, at 60° C., using continuous agitation. (Resin Dispersion 9).

Cathodic electrodeposition paints were prepared by blending 64.3 grams of Pigment Paste C with the indicated resin dispersions.

Paint 9 467.9 grams of Resin Dispersion 9 and 467.8 grams of ED 3002
Paint 9A* 935.7 grams of Resin Dispersion 9
Paint 9B* 935.7 grams of ED 3002
*Not an example of the invention.

Steel panels pretreated with zinc phosphate were cathodically electrocoated in separate baths containing the paints described above. Electrodeposition was conducted at various voltages for 2 minutes at a bath temperature of 82° F. (27° C.). The wet films were baked at 350° F. (176° C.) for 30 minutes. Film thicknesses are shown in Table XV.

TABLE XV

| Paint | Electrodeposited Films Film Thicknesses (mils) | | | | |
|---|---|---|---|---|---|
| | 100 volts | 150 volts | 200 volts | 250 volts | 300 volts |
| 9 | — | 0.74 | 0.83 | 0.94 | 1.1 |
| 9A* | 2.5–7.2 | (a) | (a) | (a) | (a) |

TABLE XV-continued

| Paint | Electrodeposited Films Film Thicknesses (mils) | | | | |
|---|---|---|---|---|---|
| | 100 volts | 150 volts | 200 volts | 250 volts | 300 volts |
| 9B* | — | 0.39 | 0.50 | 0.55 | 0.65 |

*Not examples of the invention.
(a) Ruptured

EXAMPLE 10

A cationic electrodeposition resin was prepared as follows: A cationic epoxy resin having onium groups was prepared by reacting, at 70° C. for 6 hours, a mixture of 240 grams of Epoxy Resin C and 60 grams of ethylene glycol butyl ether solvent with an aqueous solution containing 12.2 grams of nicotinamide, 11.3 grams of lactic acid, and 59.8 grams of water. Upon completion of the onium-forming reaction, 245.9 grams of Curing Agent A and 3.95 grams dibutyl tin dilaurate catalyst were blended with the resin onium prior to the slow addition of 1,877.5 grams of water while agitating continuously at 60° C. (Resin Dispersion 10).

Cathodic electrodeposition paints were prepared by adding 172.4 grams of Pigment Paste C with the indicated resin dispersions.

Paint 10 1,255.3 grams of Resin Dispersion 10 1,255.3 grams of Resin Dispersion 9
Paint 9A* 2,510.6 grams of Resin Dispersion 9
Paint 10B* 2,510.6 grams of Resin Dispersion 10
*Not an example of the invention.

Zinc phosphate pretreated steel panels were cathodically electrocoated in separate baths containing Paint 10, Paint 9A and Paint 10B. Electrodeposition was conducted at various voltages for 2 minutes at a bath temperature of 82° F. (27° C.). The resulting wet films were baked at 275° F. (135° C.) for 30 minutes. The film thicknesses are shown in Table XVI.

TABLE XVI

| Paint | Electrodeposited Films Film Thicknesses (mils) | | | |
|---|---|---|---|---|
| | 100 volts | 200 volts | 250 volts | 300 volts |
| 10 | 0.47 | 0.80 | (a) | (a) |
| 10B* | — | 0.36 | 0.36 | 0.60 |
| 9A* | 2.5–7.2 | (a) | (a) | (a) |

*Not examples of the invention.
(a) Ruptured

EXAMPLE 11

A cationic electrodeposition resin was prepared as follows: Into a suitable reactor were charged 661 grams of Epoxy Resin B, 661 grams of Epoxy Resin A and 678 grams of bisphenol A. The mixture was heated to 90° C. and 3.5 grams of a 70 percent solution of ethyl triphenyl phosphonium acetate in methanol was then added. This mixture was stirred while heating at 1.5° C./min to 150° C. whereupon it exothermed to 170° C. where it was held for approximately one hour. The epoxide equivalent weight was 1,720.

To 1,511.5 grams of the above resin was added 79.3 grams of ethylene glycol butyl ether at a temperature from 110° to 130° C. The resin solution was further cooled to 80° C. and an aqueous mixture comprised of 80.1 grams nicotinamide, 85.1 grams of an aqueous solution containing 71 percent of lactic acid, and 191.9 grams of deionized water was added dropwise over a period of 30 minutes to produce an opaque, whitish, viscous mixture. Then another 191.9 grams of deionized water was added dropwise. A reaction temperature of 80° C. was maintained for 4 hours. The product was a clear, light yellow, highly viscous solution (Cationic Resin 11).

While agitating continuously, a cationic dispersion was prepared by adding to 275.5 grams of the above cationic resin at 60° C., 82.3 grams of Curing Agent A and 4.0 grams dibutyl tin dilaurate catalyst. Then 1,038.8 grams of deionized water was added dropwise to prepare an 18 percent solids dispersion (Resin Dispersion 11). This dispersion was pigmented with Pigment Paste C. A cationic electrodeposition bath (Resin Dispersion 11) was prepared by adding 50 weight percent of the above-described dispersion to 50 weight percent of ED 3002.

Zinc phosphate pretreated steel panels were cationically electrocoated with Epoxy Resin Blend Dispersion 11 in the bath at various voltages for 2 minutes at a bath temperature of 82° F. (27° C.). The wet coatings were cured at 350° F. (176° C.) for 30 minutes. Film thicknesses are shown in Table XVII.

TABLE XVII

| Resin | | Film Thicknesses (mils) | | | |
|---|---|---|---|---|---|
| Dispersion 11 Percent | ED 3002 Percent | 200 Volts | 225 Volts | 250 Volts | 275 Volts |
| 0* | 100 | 0.45 | 0.55 | 0.57 | 0.64 |
| 50 | 50 | 0.54 | 0.63 | 0.76 | 0.92 |

*Not an example of the invention.

This data shows that coating thicknesses can be increased by blending the described cationic electrodeposition dispersion, based on a polyetherpolyol epoxide and aromatic epoxide resin blend, with a commercial cathodic electrodeposition dispersion.

EXAMPLE 12

A cationic electrodeposition resin was prepared as follows: Into a suitable reactor were charged 225 grams of Epoxy Resin B, 675 grams Epoxy Resin A, 397 grams of bisphenol A and 144.6 grams of 95 percent grade para-nonyl phenol. The mixture was heated to 90° C. and 1.4 grams of a 70 percent solution of ethyl triphenyl phosphonium acetate in methanol was then added. This mixture was stirred while heating at 1.5° C./min to 150° C. whereupon it exothermed to 170° C. where it was held for approximately one hour. The epoxide equivalent weight was 1,564.

To the above resin was added 158 grams of propylene glycol phenyl ether solvent at a temperature between 110°-130° C. The resin was further cooled to 60° C. and 68 grams of methyl ethanol amine was added dropwise. This mixture was heated at 60° C. for one hour.

To 235.5 grams of the resulting cationic resin at 60° C. was added 132.9 grams of Curing Agent B and 5.0 grams of dibutyl tin dilaurate catalyst. While agitating continuously, a cationic dispersion was prepared by adding to the resultant mixture, at 60° C., 16.4 grams of an aqueous solution containing 71 percent of lactic acid followed by the slow addition of 1,475 grams of deionized water. This dispersion was pigmented with Pigment Paste C yielding a pigment-to-vehicle ratio of 0.2/1.0 to form Resin Dispersion 12.

Resin Dispersion 12 was blended with a commercial conventional cathodic electrodeposition primer, ED 3002 in the preparation of 75 weight percent of the former and 25 weight percent of the latter to form a cationic electrodeposition bath.

Steel panels, pretreated with zinc phosphate, were cathodically electrocoated in the bath at 200, 225, 250 and 275 volts for 2 minutes at a bath temperature of 82° F. (27° C.). The wet coatings were cured at 350° F. (176° C.) for 30 minutes. Film thicknesses are shown in Table XVIII.

TABLE XVIII

| Resin | | Film Thicknesses (mils) | | | |
|---|---|---|---|---|---|
| Dispersion 12 Percent | ED 3002 Percent | 200 Volts | 225 Volts | 250 Volts | 275 Volts |
| 0* | 100 | 0.45 | 0.55 | 0.57 | 0.64 |
| 75 | 25 | 0.80 | 1.4 | 1.4 | 1.6 |

*Not an example of the invention.

This data shows that coating thicknesses can be increased by blending the described cationic electrodeposition dispersion, based on a polyetherpolyol epoxide and aromatic epoxide resin blend, with a commercial cathodic electrodeposition dispersion.

What is claimed is:

1. In a process for preparation of an advanced epoxy cationic resin from an epoxy resin composition having terminal oxirane groups which includes the step of converting oxirane groups to cationic groups by reacting a nucleophile with at least some of the oxirane groups of the epoxy resin composition wherein an organic acid and water are added during some part of this conversion, the improvement of using as the epoxy resin composition a blend of
   (I) an advanced epoxy resin obtained by reacting in the presence of a suitable catalyst
      (A) a composition comprising (1) from about 20 to 100 weight percent of a diglycidylether of a polyetherpolyol, and (2) from zero to about 80 weight percent of a diglycidylether of a dihydric phenol, and
      (B) at least one dihydric phenol
   wherein components (A) and (B) are employed in such quantities that the resultant epoxide equivalent weight is from about 350 to about 10,000, and
   (II) a different epoxy-based resin wherein at some time during preparation of the composition, the resins are converted to cationic resins whereby there is obtained a blend of a cationic, advanced epoxy resin and a different cationic epoxy-based resin; said blend containing from about 18 to about 90 percent of (I) and from about 10 to about 82 percent of (II) based on the total weight of cationic resin and having a charge density of from about 0.2 to about 0.6 milliequivalent of charge per gram of resin.

2. The process of claim 1 in which the amount of diglycidylether of a polyetherpolyol is from about 30 weight percent to 100 weight percent.

3. The process of claim 1 in which the converting of the resins to cationic resins occurs after the different epoxy resins are blended.

4. The process of claim 1 in which the resins are blended after each resin has been converted to a cationic resin.

5. The process of claim 1 in which the resins are in the form of stable aqueous oil-in-water dispersions when the blending is carried out.

6. The process of claim 1 in which the diglycidylether of a polyetherpolyol has the approximate formula

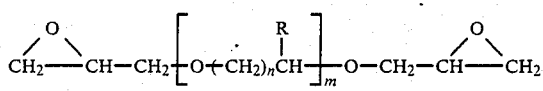

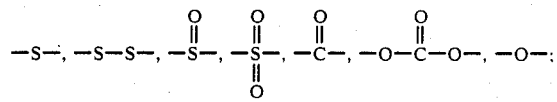

wherein R is hydrogen or lower alkyl, m is a number having an average of from 2 to 40 and n is a number from 1 to 3.

7. The process of claim 1 in which the epoxide equivalent weight of the advanced epoxy resin is from about 600 to about 3,000.

8. The process of claim 1 in which the diglycidylether of a dihydric phenol has the formula

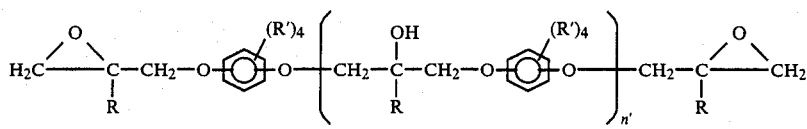

wherein each R independently is hydrogen or a hydrocarbyl group having from 1 to 3 carbon atoms, each R' independently is hydrogen, a hydrocarbyl or a hydrocarbyloxy group having from 1 to 4 carbon atoms or a halogen and n' has a value from zero to 40.

9. The process of claim 8 in which n' has a value from 0.1 to 5.

10. The process of claim 1 in which the diglycidylether of a dihydric phenol has the formula

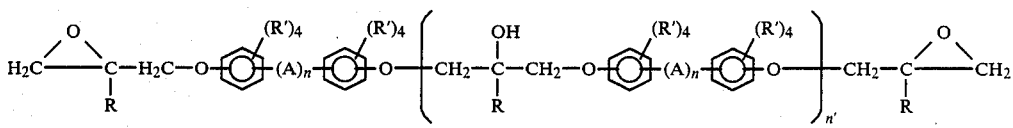

wherein A is a divalent hydrocarbon group having from 1 to 12 carbon atoms;

each R' is independently hydrogen, a hydrocarbyl or hydrocarbyloxy group having from 1 to 4 carbon atoms, or a halogen; R is independently hydrogen or a hydrocarbyl group having from 1 to 3 carbon atoms; n has a value from zero to 1; and n' has a value from zero to 40.

11. The improvement of claim 1 wherein the advanced epoxy resin, before conversion to a cationic resin, has an oxirane content of from about 1 to about 5 percent based on the total weight of the resin.

12. The improvement of claim 1 wherein the advanced epoxy resin, before conversion to a cationic resin, has an oxirane content of from about 2 percent to about 4 percent, based on the total weight of resin.

13. A composition of matter comprising the product obtained by the process of claim 1.

14. A composition of matter comprising the product obtained by the process of claim 3.

15. A composition of matter comprising the product obtained by the process of claim 4.

16. A composition of matter comprising the product obtained by the process of claim 5.

* * * * *